United States Patent
Cline et al.

(10) Patent No.: US 7,525,989 B2
(45) Date of Patent: Apr. 28, 2009

(54) SYSTEM, METHOD AND DEVICE FOR TIME SLOT STATUS MESSAGING AMONG SONET NODES

(75) Inventors: Linda Cline, Forest Grove, OR (US); Christian Maciocco, Tigard, OR (US); Srihari Makineni, Portland, OR (US); Manav Mishra, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 884 days.

(21) Appl. No.: 10/321,176

(22) Filed: Dec. 16, 2002

(65) Prior Publication Data

US 2004/0114626 A1 Jun. 17, 2004

(51) Int. Cl.
*H04J 3/16* (2006.01)
*H04L 12/43* (2006.01)
*H04L 12/40* (2006.01)

(52) U.S. Cl. .................. 370/468; 370/458; 370/438

(58) Field of Classification Search .................. None
See application file for complete search history.

(56) References Cited

U.S. PATENT DOCUMENTS

| | | | | |
|---|---|---|---|---|
| 5,412,651 | A * | 5/1995 | Gorshe | 370/412 |
| 5,490,142 | A * | 2/1996 | Hurlocker | 370/465 |
| 5,761,197 | A * | 6/1998 | Takefman | 370/337 |
| 5,956,343 | A * | 9/1999 | Cornes et al. | 370/437 |
| 6,282,187 | B1 * | 8/2001 | Evans et al. | 370/347 |
| 6,389,015 | B1 * | 5/2002 | Huang et al. | 370/376 |
| 6,614,785 | B1 * | 9/2003 | Huai et al. | 370/352 |
| 6,967,948 | B2 * | 11/2005 | Iacovino et al. | 370/384 |
| 7,123,625 | B2 * | 10/2006 | Dufour et al. | 370/459 |
| 2003/0026287 | A1 * | 2/2003 | Mullendore et al. | 370/442 |
| 2004/0073717 | A1 * | 4/2004 | Cline et al. | 709/250 |
| 2004/0105453 | A1 * | 6/2004 | Shpak et al. | 370/404 |
| 2004/0190461 | A1 * | 9/2004 | Gullickson et al. | 370/258 |

FOREIGN PATENT DOCUMENTS

| | | |
|---|---|---|
| WO | WO 97/36400 | 12/1997 |
| WO | WO 01/78329 | 10/2001 |

OTHER PUBLICATIONS

PCT International Search Report, dated Feb. 20, 2004—related to P15228PCT, International Application No. PCT/US 03/35773, International Filing Date Oct. 11, 2003 (6 pgs.).

(Continued)

*Primary Examiner*—Chi H Pham
*Assistant Examiner*—Warner Wong
(74) *Attorney, Agent, or Firm*—Grossman, Tucker, Perreault & Pfleger, PLLC

(57) ABSTRACT

Described are a system and method of transmitting a time slot status message between nodes in a SONET network. One or more time slots in a SONET link may be allocated to provision a SONET circuit. Upon provisioning or de-provisioning the SONET circuit, a time slot status message may be transmitted to one or more non-participating nodes in the SONET network to indicate a change in status of one or more time slots of the SONET link.

33 Claims, 5 Drawing Sheets

OTHER PUBLICATIONS

User Network Interface (UNI) 1.0 Signaling Specification, Optical Internetworking Forum, Oct. 1, 2001.

International Telecommunication Union (ITU) Recommendation G.707, Network Node Interface for the Synchronous Digital Hierarchy (SDH), Corregendum 1 (Mar. 2001) and Corregendum 2 (Nov. 2001).

Synchronous Optical Network (SONET), Basic Description including Multiplex Structure, Rates and Formats, American National Standards Institute (ANSI), Oct. 20, 2000.

ITU Recommendation G.707/Y.1322, Network Node Interface for the SDH, (Oct. 2000).

Office Action Received for Taiwan Patent Application No. 092131810, dated Apr. 13, 2006; pp. 3.

Office Action for Chinese Patent Application No. 200380106354 mailed Nov. 21, 2008; 10 pages.

* cited by examiner

SYSTEM, METHOD AND DEVICE FOR TIME SLOT STATUS MESSAGING AMONG SONET NODES

BACKGROUND

1. Field

The subject matter disclosed herein relates to communication systems. In particular, the subject matter disclosed herein relates to communication between nodes in a communication system.

2. Information

Telecommunication data networks typically include a network backbone comprising fiber optic communication links coupling geographically dispersed nodes. Data is typically transmitted across such a network backbone according to the "Synchronous Optical NETwork" (SONET) protocol as indicated in a set of standards provided by the American National Standards Institute (ANSI T1.105.xx) or "Synchronous Digital Hierarchy" (SDH) protocol as indicated in a set of recommendations provided by the International Telecommunications Union (e.g., ITU-T G.707, G.708, G.709, G.783 and G.784). Under the SONET/SDH protocol, a transmitting node may transmit data frames referred to as "SONET frames" to a destination node.

Nodes in a SONET network are typically arranged in a "ring" topology coupled by SONET links to transmit SONET frames between adjacent nodes in the ring. A node in a SONET ring may transmit a SONET frame other nodes by transmitting the SONET frame to either of two adjacent nodes in the SONET ring. Accordingly, SONET frames may be transmitted between nodes in a SONET ring in either a clockwise or counter clockwise direction in the ring.

Resources in a SONET network may be dynamically configured in response to service demands. A SONET link between nodes in a SONET ring may be shared among multiple communication circuits. Protocols described in a User Network Interface 1.0 Signaling Specification, Oct. 1, 2001, published by the Optical Internetworking Forum, may be used for communication between nodes in a SONET network to facilitate the dynamic allocation of resources.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
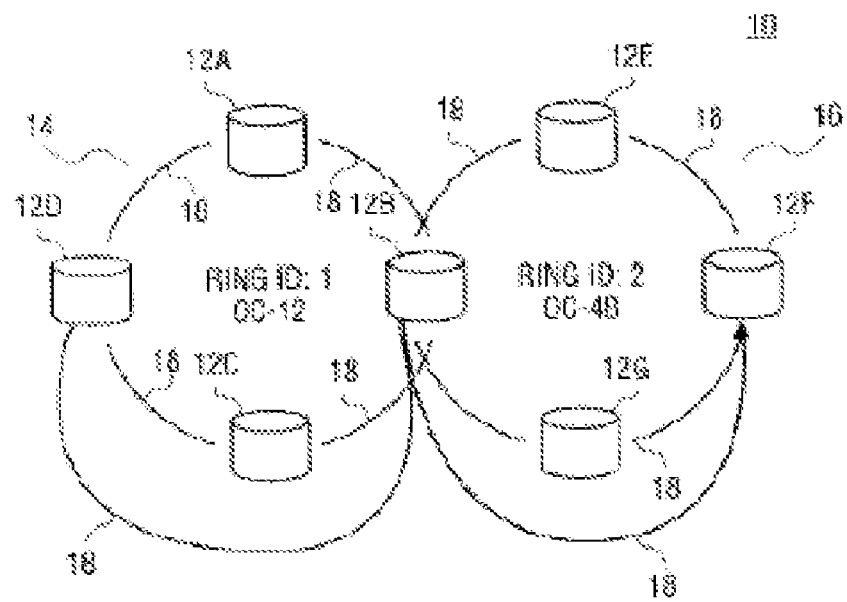
FIG. 1 shows a topology of a Synchronous Optical Network/Synchronous Digital Hierarchy (SONET/SDH) network according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relate to expressions which may be understood by one or more machines for performing one or more logical operations. For example, machine-readable instructions may comprise instructions which are interpretable by a processor compiler for executing one or more operations on one or more data objects. However, this is merely an example of machine-readable instructions and embodiments of the present invention are not limited in this respect.

"Storage medium" as referred to herein relates to media capable of maintaining expressions which are perceivable by one or more machines. For example, a storage medium may comprise one or more storage devices for storing machine-readable instructions or data. Such storage devices may comprise storage media such as, for example, optical, magnetic or semiconductor storage media. However, this is merely an example of a storage medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments of the present invention are not limited in this respect.

"Synchronous Optical Network" (SONET) as referred to herein relates to a data transmission protocol according to a set of standards provided by the American National Standards Institute (ANSI T1.105.xx). "Synchronous Digital Hierarchy" (SDH) as referred to herein relates to a data transmission protocol according to a set of recommendations provided by the International Telecommunications Union (e.g., ITU-T G.707, G.708, G.709, G.783 and G.784). "SONET/SDH" as referred to herein relates to aspects of either a SONET or SDH protocol, or both. Hereinafter, "SONET" and "SONET/SDH" may be applied interchangeably.

"Data frames" or "frames" as referred to herein relates to a segment of data which is formatted for transmission from a source to a destination. A data frame may comprise a header portion and a payload portion. A data frame may be formatted as a "SONET frame" for transmission in a data link according to a data transmission protocol such as SONET/SDH. However, these are merely examples of a data frame and embodiments of the present invention are not limited in these respects.

A "node" as referred to herein relates to a physical location in a communication network. Nodes in a communication network may be coupled by one or more data links. A node may be associated with source or destination for data frames. However, these are merely examples of a node and embodiments of the present invention are not limited in these respects.

A "SONET link" as referred to herein relates to a data link to transmit SONET frames between nodes. For example, a SONET link may comprise an optical transmission medium coupled between a SONET framer at a transmitting node and a SONET framer at a receiving node. A SONET link may also comprise two or more aggregated optical transmission media where each medium is coupled between a SONET framer at a transmitting node and a SONET framer at a receiving node. However, these are merely examples of a SONET link and embodiments of the present invention are not limited in these respects.

A "SONET network" as referred to herein relates to a plurality of nodes coupled by one or more SONET links to transmit SONET frames among the nodes. A "SONET ring" relates to a topology of nodes in a SONET network coupled by SONET links where each node is coupled to two other nodes in the topology. For example, a first node in a SONET ring may transmit a SONET frame to a second node in the SONET ring by transmitting the frame to either of two adjacent nodes in the topology. However, these are merely examples of a SONET ring and embodiments of the present invention are not limited in these respects.

The data transmission capacity of a data link may be partitioned into a plurality of "time slots" that may be allocated among processes or services. For example, distinct portions of the payload in SONET frames transmitted in a SONET link may be associated with distinct time slots where each time slot is allocated to a distinct service or process. However, these are merely examples of how data transmission capacity of a data link may be partitioned into time slots and embodiments of the present invention are not limited in these respects.

A "SONET circuit" as referred to herein relates to a service to transmit data between nodes in a SONET network over shared transmission capacity in shared SONET links. For example, for each SONET link coupling nodes in a SONET circuit, a portion of data transmission capacity may be allocated to the SONET circuit. However, this is merely an example of a SONET circuit and embodiments of the present invention are not limited in these respects. A SONET circuit may be "provisioned" by allocating one or more time slots of each SONET link coupling the nodes in the SONET circuit. However, this is merely an example of how a SONET circuit may be provisioned and embodiments of the present invention are not limited in these respects.

A "time slot status message" as referred to herein relates to a message transmitted between nodes in a data network indicating a status of at least one time slot of a data link between nodes in a network. In a SONET network, for example, a time slot status message may indicate a status of a time slot as either free or allocated to a SONET circuit. However, this is merely an example of a time slot status message and embodiments of the present invention are not limited this respects.

Briefly, an embodiment of the present invention relates to a system and method of transmitting a time slot status message between nodes in a SONET network. One or more time slots in a SONET link may be allocated to provision a SONET circuit. Upon provisioning or de-provisioning the SONET circuit, a time slot status message may be transmitted to one or more non-participating nodes in the SONET network to indicate a change in status of one or more time slots of the SONET link. However, this is merely an example embodiment and other embodiments of the present invention are not limited in these respects.

FIG. 1 shows a topology of a SONET network according to an embodiment of the present invention. A plurality of nodes 12 are coupled in a SONET ring topology by SONET links 18 where each SONET link 18 comprises a capacity to transmit data between nodes 12 in at least one direction (e.g., either clockwise, counter clockwise, or clockwise and counter clockwise in the SONET).

Each SONET link 18 may comprise one or more physical data transmission links. For example, each SONET link 18 may comprise a single physical transmission medium (e.g., optical transmission medium such as fiber optic cabling) coupled to a first SONET framer device at a first node and a second SONET framer device at a second node. Alternatively, each SONET link 18 may comprise a plurality of aggregated physical transmission media where each physical transmission medium is coupled to one of a plurality of SONET framer devices at a first node and one of a plurality of SONET framer devices at a second node.

The SONET links 18 coupling nodes 12 in a first SONET ring 14 may be capable of transmitting data between nodes 12 in SONET frames at a first set data rate. The SONET links coupling nodes 12 in a second SONET ring 16 may be capable of transmitting data between nodes 12 in SONET frames at a second set data rate higher than the first set data rate. For example, SONET links 18 in the first SONET ring 14 may be capable of transmitting data at about 625 Mbps in an OC-12 format, for example, while SONET links in the second SONET ring 16 may be capable of transmitting data at about 2.5 Gbps in an OC-48 format. However, these are merely examples of different data transmission rates and formats that may be employed in SONET links and embodiments of the present invention are not limited in these respects.

According to an embodiment, one or more SONET links 18 coupled between nodes 12 may be provisioned into one or more SONET circuits using any one of several techniques including, for example, Contiguous Concatenation, Channelized Circuit creation or Virtual Concatenation where a portion of the data transmission capacity in each SONET link may be allocated to a SONET circuit provisioned between nodes 12. However, these are merely examples of techniques that may be used to provision a SONET circuit and embodiments of the present invention are not limited in these respects. In one example, the payload portion of SONET frames transmitted in a SONET link 18 may be partitioned into "time slots" which are allocated among SONET circuits sharing the transmission capacity of the SONET link 18. According to an embodiment, a SONET link 18 coupled between nodes 12 may be partitioned among multiple SONET circuits where each SONET circuit is allocated one or more time slots in SONET link 18. For example, the payload portion of SONET frames transmitted a SONET link capable of transmitting data between nodes 12 at an OC-48 transmission rate may be portioned into four time slots, each time slot being allocated to an OC-12 SONET circuit. However, this is merely an example of how SONET frames transmitted in a SONET link may be allocated among SONET circuits and embodiments of the present invention are not limited in these respects.

According to an embodiment, a SONET circuit may be provisioned from a source node to a destination node that are not coupled together by a common SONET link. For example, a SONET circuit may be provisioned between node $12_a$ and $12_c$ where either node $12_d$ or $12_b$ is a "participating" intermediate node. If, for example, node $12_b$ is a participating intermediate node, one or more time slots in the SONET link 18 coupled between nodes $12_a$ and $12_b$, and in the SONET link 18 between nodes $12_b$ and $12_c$, may be allocated to the SONET circuit (leaving node $12_d$ as a non-participating node).

According to an embodiment, the data transmission capacity of each SONET link 18 may be partitioned into a plurality of time slots that may be allocated to a SONET circuit. Each time slot may be associated with a time slot status such as, for example, "provisioned" or "free." A time slot may have a provisioned status if currently allocated to a SONET circuit. A time slot may have a free status if it is not currently allocated to a SONET circuit and is available to be allocated to a SONET circuit. However, these are merely examples of a status that may be associated with a time slot and embodiments of the present invention are not limited in these respects.

In an alternative embodiment, a SONET circuit may be provisioned between nodes in different SONET rings. For example, a SONET circuit may be provisioned between node $12_a$ (on SONET ring 14) and node $12_g$ (on SONET ring 16). In this example, node $12_b$ common to both SONET rings 14 and 16, is an intermediate participating node while nodes $12_d$, $12_c$, $12_e$ and $12_f$ are non-participating nodes.

According to an embodiment, a first node 12 may be capable of initiating a provisioning of a SONET circuit between itself and a second node 12. The first node 12 may initiate an allocation of one or more time slots in one or more SONET links coupled between the first node 12 and the second node 12 where each of the allocated time slots is to be used in the provisioned SONET circuit. One or more of the nodes 12 (including the first node 12) may maintain a database associating each time slot in the one or more SONET links with its time slot status. For example, the first node 12 may maintain a database associating a time slot status with each of the time slots in each SONET link coupled between the first and second nodes. Based upon information in the database, the first node 12 may initiate an allocation of time slots from among the free time slots to initiate provisioning of the SONET circuit. Upon provisioning of the SONET circuit by an allocation of free time slots, the status of the allocated time slots may be changed from free to provisioned.

Figure 2:
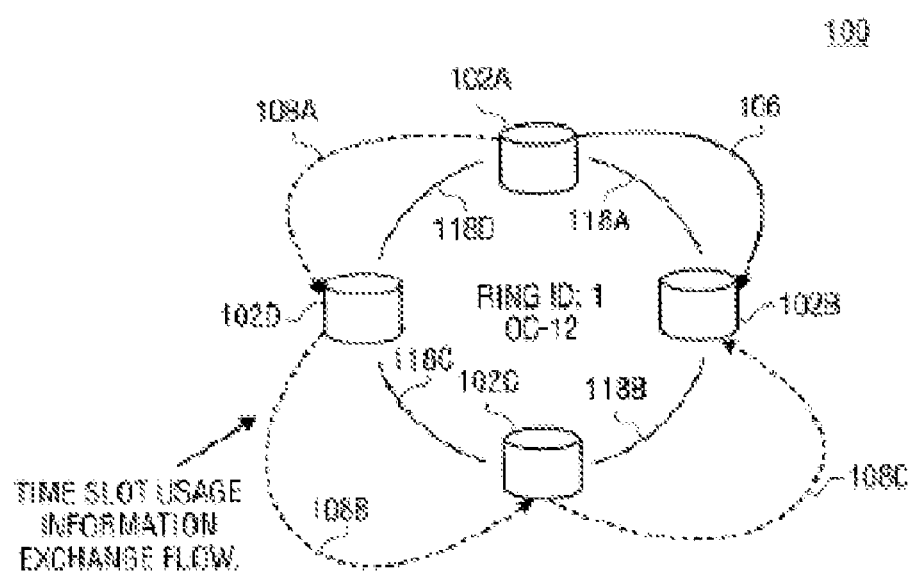
FIG. 2 shows a topology of a SONET ring in a SONET network according to an embodiment of the SONET network topology shown in FIG. 1.

FIG. 2 shows a topology of a SONET ring in a SONET network according to an embodiment of the topology shown in FIG. 1. Nodes 102 are coupled by SONET links 118 to transmit SONET frames. In addition to the SONET links 118, the nodes 102 are coupled to one another by control links 108 to be used in transmitting status information associated with time slots in the SONET links 118. According to an embodiment, a node 102 may initiate allocation of time slots in SONET links coupled to one or more participating nodes 102 using SONET control protocols such as protocols provided in the User Network Interface 1.0 Signaling Specification, Oct. 1, 2001, published by the Optical Internetworking Forum (hereinafter-"the UNI Specification"). However, these are merely examples of protocols that may be used to allocate data transmission resources in SONET links coupled between nodes and embodiments of the present invention are not limited in these respects.

In one example, node $102_a$ may initiate provisioning a SONET circuit between nodes $102_a$ and $102_b$ by allocating one or more "free" time slots (as indicated in the database associated with node $102_a$) in the SONET link $118_a$. The SONET link $118_a$ may have a data transmission capacity of OC-12 that may be partitioned into twelve time slots. Protocols according to the UNI Specification may be used to provision a SONET circuit 106 having a transmission capacity of OC-3 by allocating three of the twelve time slots to the SONET circuit 106.

Upon allocation of the one or more time slots, the node $102_a$ may transmit a time slot status message on a control link $108_a$ to indicate that the status of the allocated time slots has changed from free to provisioned. Upon receipt of the time slot allocation message, the node $102_d$ may forward the time slot status message to node $102_c$, on control link $108_b$. This forwarding of the time slot status message may continue until it has been received at all of the non-participating nodes 102 (e.g., ending at node $102_c$ in the presently illustrated embodiment). Upon receipt of the time slot status message, each non-participating node 102 may update its database associating a time slot status with the allocated time slots to indicate that the allocated time slots are provisioned.

In addition to initiating an allocation of one or more time slots to provision a SONET circuit, a node 102 may initiate a de-allocation of the allocated time slots to de-provision or "tear down" the SONET circuit (e.g., using protocols provided in the UNI Specification). For example, node $102_a$ may transmit a message to $102_b$ to de-provision the SONET circuit 106 by releasing time slots allocated. Upon release of the allocated time slots, the node $102_a$ may also transmit a time slot status message to the non-participating nodes $102_d$ and $102_c$ on control links $108_a$ and $108_b$ to indicate a change in status of the released time slots. Upon receipt of the time slot status message, the non-participating nodes $102_d$ and $102_c$ may each update its database associating a time slot status with the de-allocated time slots to indicate that the de-allocated time slots are free.

Figure 3:
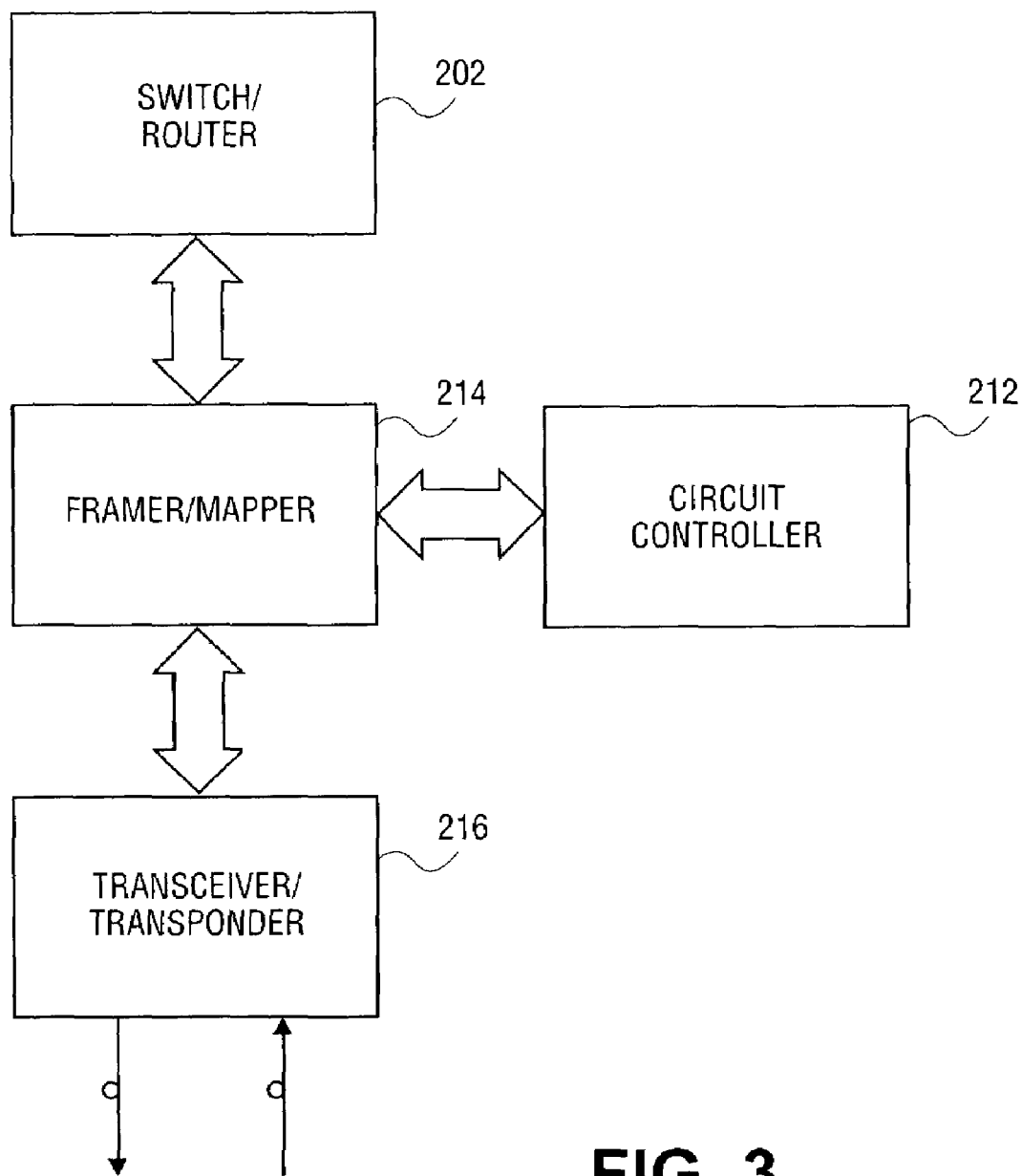
FIG. 3 shows a schematic diagram of a system to transmit SONET frames in a SONET/SDH links according to an embodiment of the system topology shown in FIG. 2.

FIG. 3 shows a schematic diagram of a system at a first node to transmit data to a second node according to an embodiment of the SONET network shown in FIG. 2. A framer/mapper 214 may comprise a SONET framer to receive and transmit SONET frames and a mapper to map services to data paths in the SONET frames. The framer/mapper 214 may be coupled to a transceiver/transponder 216 to transmit or receive data in an optical transmission medium. The framer/mapper 214 may provide one or more SONET paths to transmit data to or receive data from a switch/router 202 over a standard data interconnection such as versions of a System Packet Interface (e.g., SPI-4, SPI-4 phase II or SPI 5) or UTOPIA bus, or a proprietary data interconnection. A circuit controller 212 may comprise logic to provision or de-provision one or more SONET circuits defined in the framer/mapper 214.

The framer/mapper 214 may transmit SONET frames to or receive SONET frames from another node in a SONET ring (e.g., a node 102 as shown in FIG. 2). The framer/mapper 214 may also associate portions of a payload in SONET frames transmitted to or received from a SONET link with time slots that may be allocated to one or more SONET circuits. According to an embodiment, the framer/mapper 214 may be dynamically configured to associate time slots with SONET circuits in response to commands from the circuit controller 212. In response to a provisioning of a SONET circuit, for example, the circuit controller 212 may configure the framer/mapper 214 to associate the provisioned SONET circuit with one or more allocated time slots of a SONET link.

The circuit controller 212 may comprise logic to transmit messages to or receive messages from a circuit controller at another node (not shown) to provision and de-provision SONET circuits in one or more SONET links. For example, the circuit controller 212 may comprise logic to provision and de-provision SONET circuits using protocols such as those provided in the UNI Specification. Additionally, the circuit controller 212 may comprise logic to transmit time slot status messages to, or receive time slot messages from, non-participating nodes in a control link (e.g., control link 108). While acting as part of non-participating node, the circuit controller 212 may also comprise logic to receive time slot status messages from a control link and update a database associating time slots in a SONET link with a time slot status.

Logic in the circuit controller 212 may comprise a processor to execute machine-readable instructions stored in a storage medium. Alternatively, logic in the circuit controller 212 may comprise an ASIC or FPGA. In one embodiment, a control link to transmit messages between the circuit controllers of respective nodes may comprise an in-band messaging link encapsulated in SONET frames. Alternatively, the control link may comprise an out of band medium such as an Ethernet data link. However, these are merely examples of how circuit controllers of different nodes in a SONET ring may transmit and receive time slot status messages and embodiments of the present invention are not limited in these respects.

Figure 4:
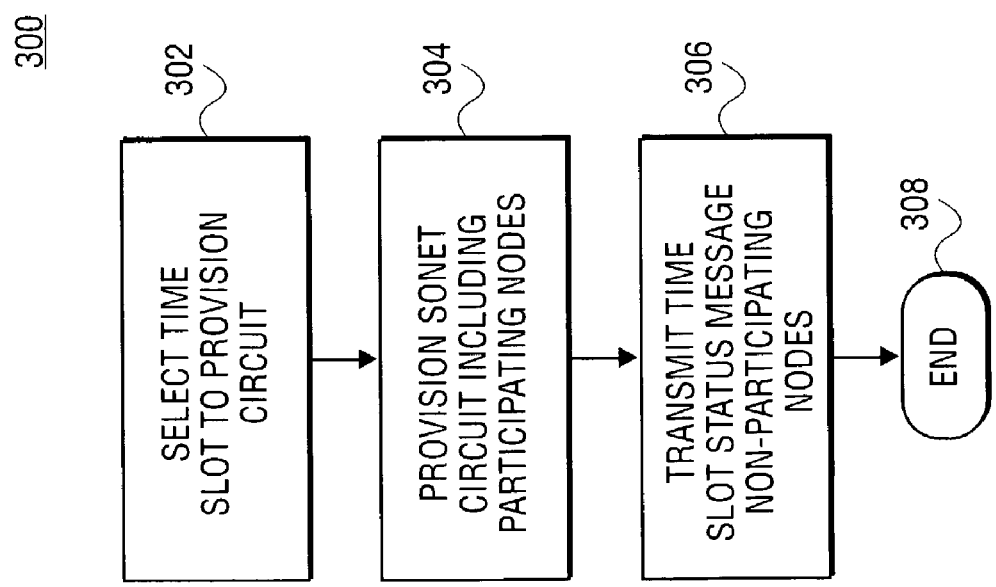
FIG. 4 shows a flow diagram illustrating a process executed at a node in response to provisioning a SONET circuit according to an embodiment of the system shown in FIG. 3.

FIG. 4 shows a flow diagram illustrating a process 300 executed at a node in response to provisioning a SONET circuit according to an embodiment of the system shown in FIG. 3. At block 302, one or more time slots in SONET links coupled to participating nodes are selected for use in provisioning a SONET circuit. The selected time slot(s) may be selected from among time slots in a SONET link that are associated with a "free" status indication in a database. A circuit controller associated with the node initiating the creation of the SONET circuit may then update the database to indicate a change in status of the time slot from free to provisioned. To complete the allocation of the selected time slot(s) to the SONET circuit, at block 304, messages may be transmitted to or received from participating nodes according to protocols provided in the UNI Specification. Upon completion of allocating the selected time slot(s), block 306 may initiate transmission of time slot status messages to non-participating nodes to indicate a change in status of the allocated time slots.

Figure 5:
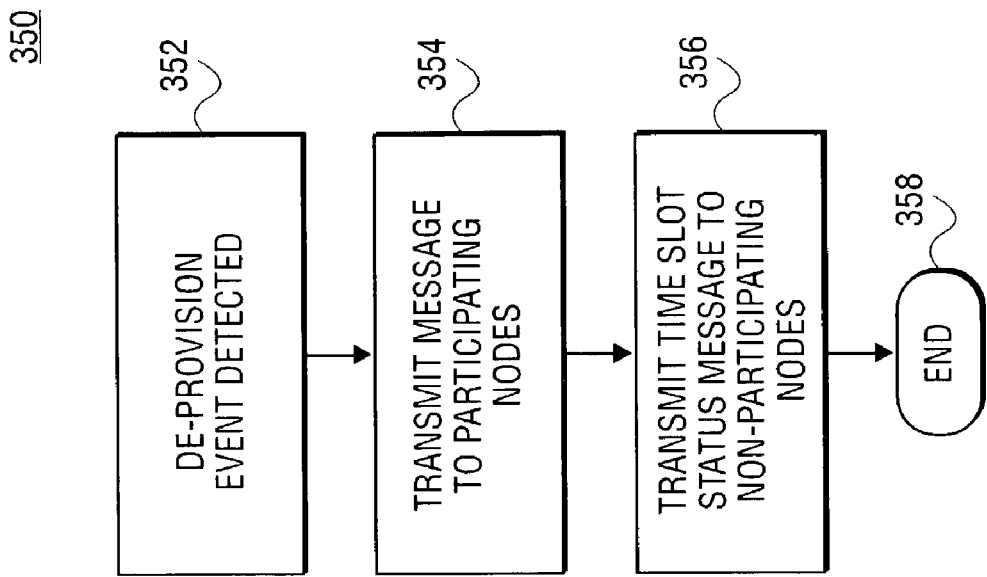
FIG. 5 shows a flow diagram illustrating a process executed at a node in response to de-provisioning a SONET circuit according to an embodiment of the system shown in FIG. 3.

FIG. 5 shows a flow diagram illustrating a process 350 executed at a node to de-allocate time slots in response to a de-provisioning of a SONET circuit according to an embodiment of the system shown in FIG. 3. At block 352, a circuit controller may detect an event (e.g., a "tear down" event) to de-provision a SONET circuit and update a database associated with the node to change the status of affected time slots from provisioned to free. At block 354, the circuit controller may communicate with participating nodes to de-allocate time slots allocated to the SONET circuit. For example, the circuit controller may transmit messages to or receive messages from the participating nodes according to protocols provided in the UNI Specification. Block 356 may then initiate transmission of time slot status messages to non-participating nodes to indicate a change in status of the de-allocated time slots from provisioned to free.

Figure 6:
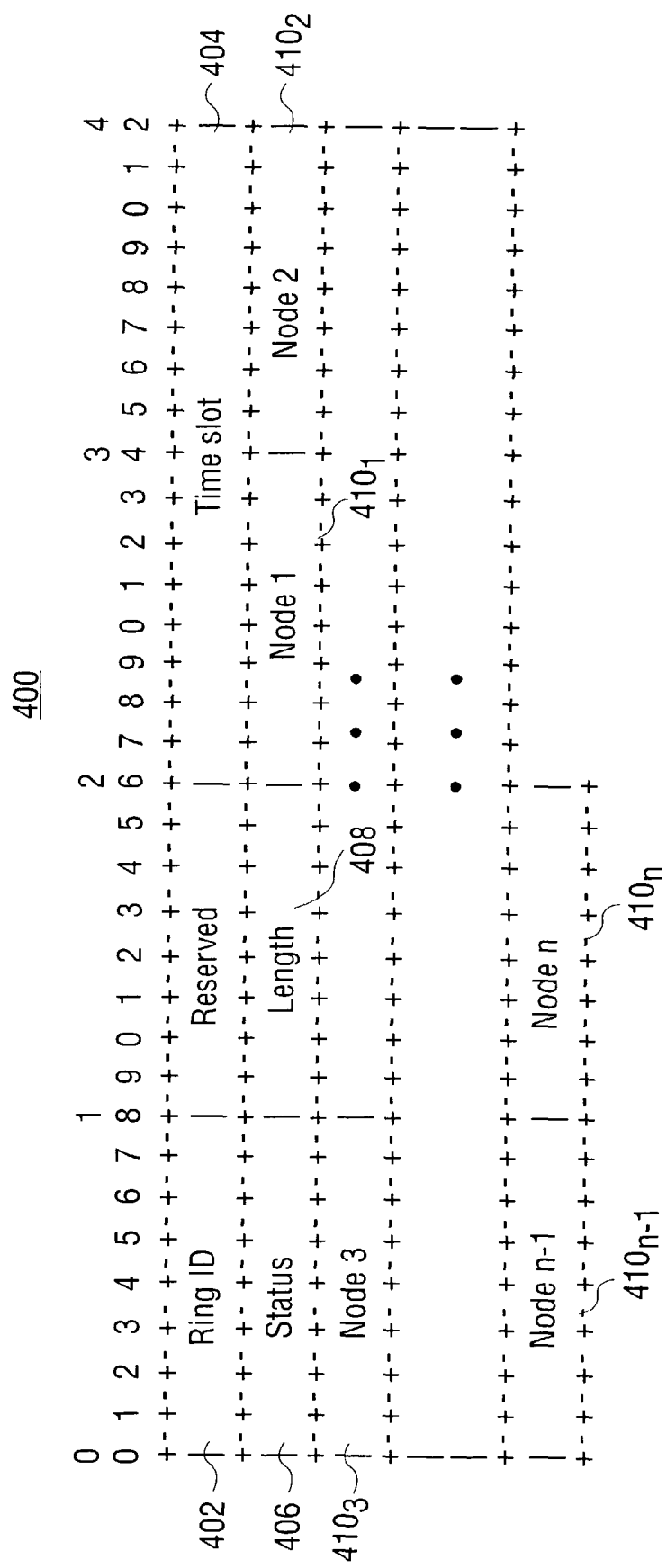
FIG. 6 shows a format for a packetized time slot status message according to an embodiment of the processes shown in FIGS. 4 and 5.

FIG. 6 shows a format for a packetized time slot status message 400 to be transmitted to non-participating nodes in a control link according to an embodiment of the processes shown in FIGS. 4 and 5. The format comprises a plurality of fields including a Ring ID field 402, Time Slot field 404, a Status Field 406 and one or more Node fields 410. The Ring ID field 402 may uniquely identify a SONET ring and Node fields 410 may uniquely identify participating nodes in the SONET ring that are used in a SONET circuit. Accordingly, non-participating nodes in the associated SONET ring to receive the message 400 may not be listed in Node fields 410. If non-participating nodes on other SONET rings in a SONET network are to receive the time slot status message 400, an additional time slot status message may be formulated for each additional SONET ring.

The Time Slot field 404 may uniquely identify a time slot of a SONET link that may be allocated for provisioning a SONET circuit. The Time Slot field 404 may comprise information associated with a SONET "Line" coupled between nodes and a portion of SONET frames transmitted in the SONET line between line terminating equipment (LTE) at each node. However, this is merely an example of how a time slot in a SONET link may be identified and embodiments of the present invention are not limited in these respects. The Status field 406 may indicate the status of the time slot identified in the Time Slot field 404 as either free or provisioned as described above.

According to an embodiment, the Node field $410_1$ may identify a source node at a first endpoint of a SONET circuit that initially transmits the time slot status message 400, and a Node field $410_n$ may identify a destination node at a second endpoint of the SONET circuit. Node fields $410_2$ through $410_{n-1}$ may then identify intermediate nodes in the SONET circuit between the source node and the destination node. The source node may transmit the time slot status message 400 to a non-participating node that is not identified in the Node fields 410. Upon receipt of the time slot status message, a circuit controller at a non-participating node may update a database to reflect a change in a status (as indicated in Status field 406) of a time slot identified in Time Slot field 404. The circuit controller may then transmit the time slot status message 400 to a subsequent non-participating node in the SONET ring. The time slot status message 400 may be repeatedly forwarded to non-participating nodes in the SONET ring until received by each non-participating node. Upon receipt of the time slot status message 400, a participating node (e.g., either the source node identified in Node field $410_1$ or the destination node identified in Node field $410_n$) may terminate forwarding the time slot status message 400 to any other node.

The time slot allocation message 400 may be transmitted to a circuit controller (e.g., at block 306 or 356) using any one of several in-band or out-of-band messaging techniques. In one in-band messaging technique, for example, the time slot status message 400 may be encapsulated in a portion of a Data Communication Channel (DCC) of a SONET Section or Line Overhead of a SONET frame (e.g., transmitted in a SONET link coupled between node in a SONET ring). A portion of the time slot allocation 400 may be transmitted in the header of each of a sequence of SONET frames transmitted to a recipient node. Within a SONET Section Overhead, for example, the time slot allocation message 400 may be encapsulated in user defined bytes D1-D3. Alternatively, the time slot allocation message 400 may be encapsulated in SONET Line Overhead bytes D4-D12. Within the DCC, the time slot status message 400 may also be encapsulated in a data link frame according to a link-level protocol such as the High-level Data Link Control (HDLC) protocol. Upon receipt of the encapsulated data link frame, the encapsulated control link frame may be processed for message detection and verification to receive the time slot status message 400. A circuit controller at a receiving node may then use the information in the time slot status message 400 to update the status of the time identified in Time Slot field 404.

In an alternative to encapsulating the time slot status message 400 in a DCC, the time slot status message 400 may be encapsulated in an out of band message. For example, the link aggregation message may be transmitted between a data link controller at transmitting node to a circuit controller at a receiving node in an out-of-band message according to a Link Management Protocol or RSVP-TE protocol. For example, the circuit controller at transmitting node to a circuit controller at a receiving node may be coupled to an Ethernet connection to transmit the link aggregation. However, this is merely an example of how a link aggregation message may be transmitted between circuit controllers in an out-of-band message and embodiments of the present invention are not limited in these respects.

Figure 7:
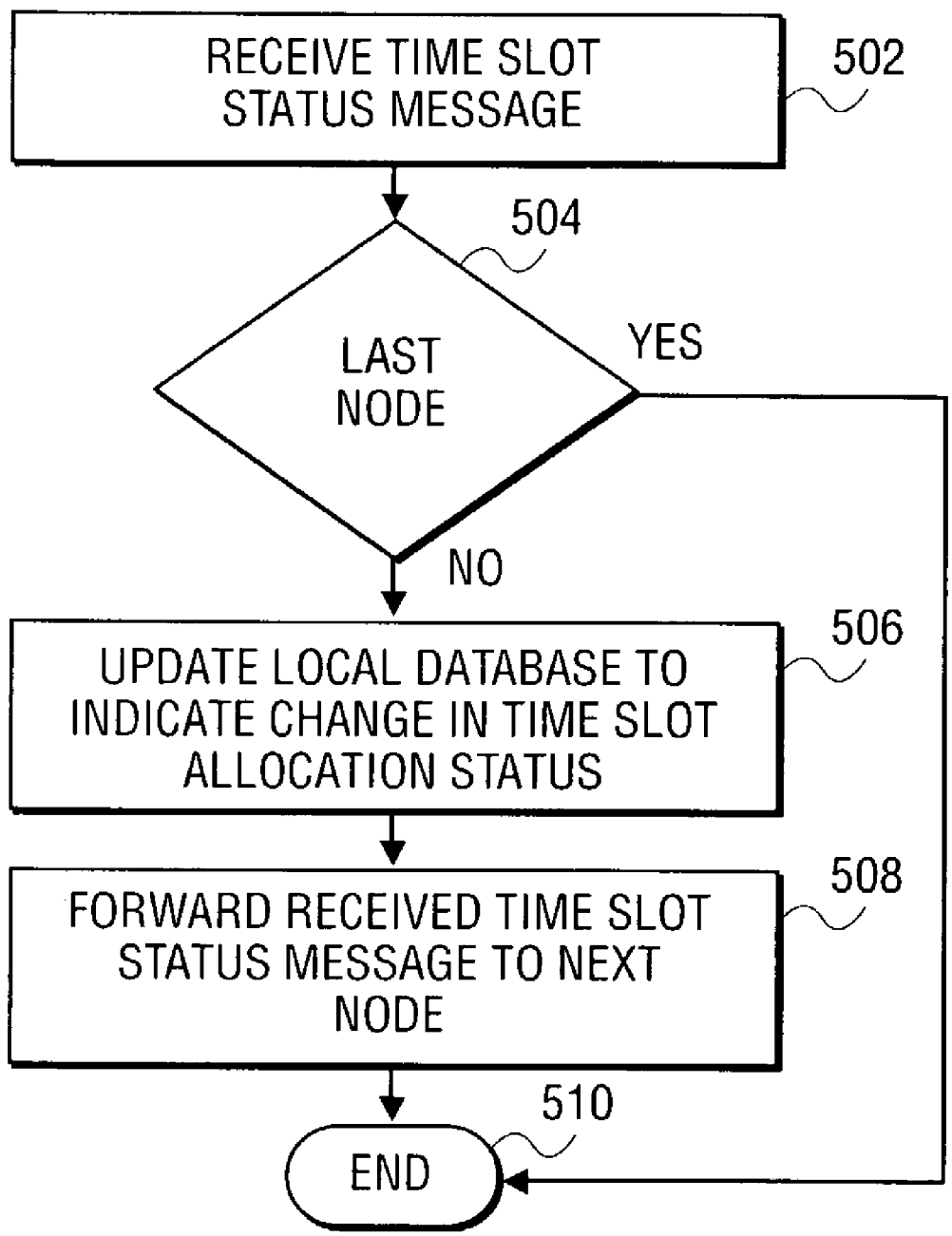
FIG. 7 shows a flow diagram illustrating a process initiated upon receipt of a time slot status message at a node according to an embodiment of the packetized time slot status message shown in FIG. 6.

FIG. 7 shows a flow diagram illustrating a process 500 executed at a node upon receipt of a time slot status message at a node according to an embodiment of the packetized time slot status message shown in FIG. 6. At block 502, a circuit controller at the node may receive the time slot status message on an in-band or out-of-band control link. If the recipient node is the last node to receive the time slot status message as determined at diamond 504, the time slot status message may not be forwarded. According to the embodiment of the time slot status message 400 shown in FIG. 6, a participating node such as the destination node identified in the last Node field $410_n$ receiving the time slot status message may determined that it is the last node by detecting its identifier in a Node field 410. Otherwise, if the recipient node is not the last node to receive the time slot status message, the circuit controller may update a local database to indicate a change in the status of the time slot identified in the time slot status message at block 506, and may forward the time slot status message to another node at block 508.

The embodiment of FIG. 7, if the recipient node is the last node to receive the time slot status message, a circuit controller associated with the recipient node suspends forwarding the time slot status message and does not update a local database to indicate a change in status associated with a time slot. In other embodiments, however, the last recipient node may update a local database (e.g., if the last recipient node is a non-participating node). For example, the last recipient node may be a non-participating node that updates a local database to indicate a change in status associated with a time slot and ceases forwarding the time slot status message 400 if the next node that is to receive the message 400 is the destination node identified in field $410_n$.

In the embodiment shown in FIG. 2, the node $102_a$ may initiate a provisioning of a SONET circuit to node $102_b$ in a "clockwise" direction in the SONET ring topology by initiating an allocation of time slots in link $118_a$. Correspondingly, the node $102_a$ may initiate forwarding of time slot status messages to non-participating nodes 102 in a "counter clockwise" direction in the SONET ring topology according to the embodiments illustrated in FIGS. 4 through 6. Non-participating nodes 102 may then forward time slot status messages in the counter clockwise direction according to the embodiment of process 500 shown in FIG. 7.

For example, the time slot status message 400 may list all participating nodes in the SONET ring in order from the source node to the destination node in the clockwise direction in Node fields $410_1$ through $410_n$. A circuit controller at each node in the SONET ring receiving the message 400 may determine whether the node is the last node to receive the message 400, at diamond 504, by determining whether the recipient node is the destination node identified in Node field $410_n$. If the recipient node is the destination node, for example, diamond 504 may determine that the message 400 is not to be forwarded to another node.

By forwarding time slot status messages in a direction opposite to the direction of the SONET circuit, the time slot status message need not traverse the participating nodes 102 which may add delay. Accordingly, the recipient non-participating nodes 102 may update local databases to reflect changes in the status of time slots more quickly than if time slot status messages were forwarded in the same direction of the SONET circuit.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A system comprising:
   a switch fabric comprising a plurality of ports;
   a plurality of SONET framers, each SONET framer being coupled to a port of the switch fabric; and
   a circuit controller at a source node to transmit data to a destination node in a SONET network, and coupled to at least one of the SONET framers, the circuit controller comprising:
      logic to initiate an allocation of one or more time slots in SONET links coupled between the source node and the destination node to provision a SONET circuit between the source and destination nodes, wherein a data transmission capacity of each said SONET link corresponds to the number of said time slots allocated to said each SONET link, each of said time slots being allocated to a distinct service or process; and
      logic to initiate transmission of a time slot status message to one or more nodes in the SONET network which are not in the provisioned SONET circuit, the time slot status message identifying at least one allocated time slot within said provisioned SONET circuit, said time slot status message including a Ring ID field, a time slot field, a status field and at least one node field.

2. The system of claim 1, wherein each SONET framer is coupled to a port of the switch fabric by an interconnection formed according to a System Packet Interface.

3. A method executable at a source node to transmit data to a destination node in a SONET network, comprising:
   initiating an allocation of one or more time slots in SONET links coupled between the source node and the destination node to provision a SONET circuit between the source and destination nodes, wherein a data transmission capacity of each said SONET link corresponds to the number of said time slots allocated to each said SONET link, each of said time slots being allocated to a distinct service or process; and
   initiating transmission of a time slot status message to one or more nodes in the SONET network which are not in the provisioned SONET circuit, the time slot status message identifying at least one allocated time slot within said provisioned SONET circuit, said time slot status message including a Ring ID field, a time slot field, a status field and at least one node field.

4. The method of claim 3, wherein the time slot status message comprises information identifying one or more nodes in the SONET network that are to receive the time slot status message.

5. The method of claim 3, the method further comprising:
initiating an allocation of a plurality of time slots in the one or more SONET links; and
initiating transmission of a time slot status message to the one or more nodes in the SONET network which are not in the provisioned SONET circuit for each of the allocated time slots.

6. The method of claim 3, the method further comprising initiating the allocation of the one or more time slots based upon protocols defined in a User Network Interface.

7. The method of claim 3, the method further comprising:
initiating a de-allocation of one or more time slots in at least one SONET link coupled between the source node and the destination node to de-provision the SONET circuit; and
initiating transmission of a second time slot status message to the one or more nodes not in the provisioned SONET circuit, the time slot status message identifying at least one de-allocated time slot.

8. A controller at a source node to transmit data to a destination node in a SONET network, comprising:
logic to initiate an allocation of one or more time slots in SONET links coupled between the source node and the destination node to provision a SONET circuit between the source and destination nodes, wherein a data transmission capacity of each said SONET link corresponds to the number of said time slots allocated to each said SONET link, each of said time slots being allocated to a distinct service or process; and
logic to initiate transmission of a time slot status message to one or more nodes in the SONET network which are not in the provisioned SONET circuit, the time slot status message identifying at least one allocated time slot within said provisioned SONET circuit, said time slot status message including a Ring ID field, a time slot field, a status field and at least one node field.

9. The controller of claim 8, wherein the time slot status message comprises information identifying one or more nodes in the SONET network that are to receive the time slot status message.

10. The controller of claim 8, the controller further comprising:
logic to initiate an allocation of a plurality of time slots in the one or more SONET links; and
logic to initiate transmission of a time slot status message to the one or more nodes in the SONET network which are not in the provisioned SONET circuit for each of the allocated time slots.

11. The controller of claim 8, the controller further comprising logic to initiate the allocation of the one or more time slots based upon protocols defined in a User Network Interface.

12. The controller of claim 8, the controller further comprising:
logic to initiate a de-allocation of one or more time slots in at least one SONET link coupled between the source node and the destination node to de-provision the SONET circuit; and
logic to initiate transmission of a second time slot status message to the one or more nodes not in the provisioned SONET circuit, the time slot status message identifying at least one de-allocated time slot.

13. An article at a source node to transmit data to a destination node in a SONET network, the article comprising a storage medium having stored thereon instructions that when executed by a machine result in the following:
initiate an allocation of one or more time slots in SONET links coupled between the source node and the destination node to provision a SONET circuit between the source and destination nodes, wherein a data transmission capacity of each said SONET link corresponds to the number of said time slots allocated to each said SONET link, each of said time slots being allocated to a distinct service or process; and
initiate transmission of a time slot status message to one or more nodes in the SONET network which are not in the provisioned SONET circuit, the time slot status message identifying at least one allocated time slot within said provisioned SONET circuit, said time slot status message including a Ring ID field, a time slot field, a status field and at least one node field.

14. The article of claim 13, wherein the time slot status message comprises information identifying one or more nodes in the SONET network that are to receive the time slot status message.

15. The article of claim 13, wherein the storage medium further comprises machine-readable instructions stored thereon to:
initiate an allocation of a plurality of time slots in the one or more SONET links; and
initiate transmission of a time slot status message to the one or more nodes in the SONET network which are not in the provisioned SONET circuit for each of the allocated time slots.

16. The article of claim 13, wherein the storage medium further comprises machine-readable instructions stored thereon to initiate the allocation of the one or more time slots based upon protocols defined in a User Network Interface.

17. The article of claim 13, wherein the storage medium further comprises machine-readable instructions stored thereon to:
initiate a de-allocation of one or more time slots in at least one SONET link coupled between the source node and the destination node to de-provision the SONET circuit; and
initiate transmission of a second time slot status message to the one or more nodes not in the provisioned SONET circuit, the time slot status message identifying at least one de-allocated time slot.

18. A method executable at a first node to transmit data to a second node in a SONET network comprising:
receiving a first time slot status message at said first node in a SONET ring which is not in a provisioned SONET circuit, the first time slot status message identifying a status of at least one time slot in a SONET link coupled between at least two nodes in said provisioned SONET circuit, wherein a data transmission capacity of said SONET link corresponds to the number of said time slots allocated to each said SONET link, each of said time slots being allocated to a distinct service or process;
updating a status associated with the time slot in a database associated with said first node in response to the first time slot status message; and
forwarding a second time slot status message from said first node to a second node in the SONET ring which is not in said provisioned SONET circuit, the second time slot status message being based, at least in part, upon the first time slot status message, said first and second time slot status messages including a Ring ID field, a time slot field, a status field and at least one node field.

19. The method of claim 18, wherein the first time slot status message comprises information identifying one or more nodes in the SONET circuit that are to receive the first time slot status message.

20. The method of claim 18, wherein receiving the first time slot status message comprises receiving the first time slot status message in a data frame encapsulated in a header portion of one or more SONET frames.

21. The method of claim 20, wherein forwarding the second time slot status message comprises forwarding the second time slot status message in a data frame encapsulated in a header portion of one or more SONET frames.

22. The method of claim 18, wherein receiving the first time slot status message comprises receiving the first time slot status message in a data frame from an Ethernet data link.

23. The method of claim 22, wherein forwarding the second time slot status message comprises forwarding the second time slot status message in a data frame to an Ethernet data link.

24. The method of claim 22, the method further comprising receiving the first time slot status according to a Link Management Protocol.

25. The method of claim 22, the method further comprising receiving the first time slot status message according to an RSVP-TE protocol.

26. A controller at a first node to transmit data to a second node in a SONET network comprising:
 logic to receive a first time slot status message at said first node in a SONET ring which is not in a provisioned SONET circuit, the first time slot status message identifying a status of at least one time slot in a SONET link coupled between at least two nodes in said provisioned SONET circuit, wherein a data transmission capacity of said SONET link corresponds to the number of said time slots allocated to each said SONET link, each of said time slots being allocated to a distinct service or process;
 logic to update a status associated with the time slot in a database associated with said first node in response to the first time slot status message; and
 logic to forward a second time slot status message from said first node to a second node in the SONET ring which is not in said provisioned SONET circuit, the second time slot status message being based, at least in part, upon the first time slot status message, said first and second time slot status messages including a Ring ID field, a time slot field, a status field and at least one node field.

27. The controller of claim 26, wherein the first time slot status message comprises information identifying one or more nodes in the SONET circuit that are to receive the first time slot status message.

28. The controller of claim 26, the controller further comprising logic to receive the first time slot status message comprises in a data frame encapsulated in a header portion of one or more SONET frames.

29. The controller of claim 28, the controller further comprising logic to forward the second time slot status message in a data frame encapsulated in a header portion of one or more SONET frames.

30. The controller of claim 26, the controller further comprising logic to receive the first time slot status message in a data frame from an Ethernet data link.

31. The controller of claim 30, the controller further comprising logic to forward the second time slot status message in a data frame to an Ethernet data link.

32. The controller of claim 30, the controller further comprising logic to receive the first time slot status according to a Link Management Protocol.

33. The controller of claim 30, the controller further comprising logic to receive the first time slot status message according to an RSVP-TE protocol.

* * * * *